United States Patent [19]

Buheitel

[11] Patent Number: 5,210,419
[45] Date of Patent: May 11, 1993

[54] METHOD FOR LIQUID SCINTILLATION COUNTING OF RADIOACTIVE NUCLIDES

[76] Inventor: Ferdinand Buheitel, Eichenstrasse 4, 8077 Reichertshofen 2, Fed. Rep. of Germany

[21] Appl. No.: 564,875

[22] Filed: Aug. 9, 1990

[30] Foreign Application Priority Data

Aug. 10, 1989 [EP] European Pat. Off. ............ 89114850

[51] Int. Cl.[5] .............................................. G01T 1/204
[52] U.S. Cl. ..................................... 250/362; 250/328; 250/364
[58] Field of Search ............................ 250/362, 328, 364

[56] References Cited

U.S. PATENT DOCUMENTS

| | | | |
|---|---|---|---|
| 3,772,512 | 11/1973 | Laney | 250/366 |
| 4,031,392 | 6/1977 | Giraud et al. | 250/328 |
| 4,395,635 | 7/1983 | Friauf et al. | 250/366 |
| 4,476,388 | 10/1984 | Yakubovich et al. | 250/361 |
| 4,651,006 | 3/1987 | Valenta | 250/362 |
| 4,652,751 | 3/1987 | Rundt et al. | 250/362 X |
| 4,687,935 | 8/1987 | Normi et al. | 250/328 X |
| 4,694,176 | 9/1987 | Horrocks | 250/362 |
| 4,833,326 | 5/1989 | Valenta et al. | 250/362 |
| 4,918,310 | 4/1990 | Rundt et al. | 250/328 |

OTHER PUBLICATIONS

Assaf et al., "Direct Determination of Short-Lived Radon Daughter Products on Air Filters by Liquid Scintillation Counting Using Detailed-Coincidence Technique", Nuclear Instruments & Methods, 49, 1967, pp. 29–37.
Oikari et al., "Simultaneous Counting of Low Alpha & Beta Particle Activities with Liquid Scintillation Spectrometery & Pulse-Shape Analysis", Appl. Radiat. Isot., 38, 1987, pp. 875–878.
Segre, E., "Nuclei and Particles——An Introduction to Nuclear and Subnuclear Physics," W. A. Benjamin, Inc., pp. v, vi, 153–160 (1986).
Friedlander, G., et al., "Nuclear and Radiochemistry—l'Revised Version of Introduction to Radiochemistry," John Wiley & Sons, Inc., pp. v, vi; 127–137 (1955).
Cothern, C. R., et al., "Compliance Data for the Occurrence of Radium and Gross alpha-Particle Acitivty in Drinking Water Supplies in the United States," Health Physics, vol. 46, No. 3, pp. 503–510 (Mar. 1984).
Case, G. N., et al., "Separation of Radium and Its Determination by Photon/Electron-Rejecting Alpha Liquid Scintillation Spectrometry," R & R, pp. 60–69.
Polach, H., et al., "Determination of Radon by Liquid Scintillation alpha/beta Particle Spectrometry: Towards the Resolution of a 14C Dating Problem," Radiocarbon, vol. 30, No. 1, pp. 19–24 (1988).
Horrocks, D. L., "Alpha Particle Energy Resolution in a Liquid Scintillator," The Review of Scientific Instruments, vol. 35, No. 3, pp. 334–340 (Mar. 1964).
Rubinson, W., "The Equations of Radioactive Transformation in a Neutron Flux," J. Chemical Physics, vol. 17, No. 6, pp. 542–547, (Jun. 1949).
Blanchard, R. L., et al., "Radiological Sampling and Analytical Methods for National Primary Drinking Water Regulations," Health Physics, vol. 48, No. 5, pp. 587–600 (May 1985).

Primary Examiner—Constantine Hannaher
Assistant Examiner—Edward J. Glick
Attorney, Agent, or Firm—Fredrikson & Byron

[57] ABSTRACT

"A method for liquid scintillation counting of the radioactive nuclides of the natural decay chains of Th-232, U-238 and U-235 by detecting decay events of the short-lived members Po-212, Po-214 and Po-215 of these decay chains by the principle of delayed coincidence, characterized in that a separate pulse height spectrum is recorded for those pulses of the counting device which occur within a fixed short time interval after a preceding pulse. The successive decays cause pairs of quickly succeeding pulses to be detected; the coincidence of these pulses within a brief time interval makes it possible to distinguish the decay events from other decay events. The invention further permits simultaneous counting of different isotopes by fixing several short time intervals following a first pulse, and assigning a second pulse following the first pulse to one of several separate pulse height spectra in accordance with the length of the time interval within which the second pulse occurs."

9 Claims, 5 Drawing Sheets

FIG.1a

| | | | | | | | | U238 24,1d β- | →α | U238 4,5·10⁹a |
|---|---|---|---|---|---|---|---|---|---|---|
| URANIUM-238 | | | | | | | | | | Pa234 β- |
| | | | | | | | | | | |
| Pb214 26,8m β- | ←α | Po218 3,05m | ←α | Rn222 3,8d | ←α | Ra226 1600a | ←α | Th230 8·10⁴a | ←α | U234 2,5·10⁵a |
| | | Bi214 19,8m β- | | | | | | | | |
| Pb210 22a β- | ←α | Pb214 162μs | | | | | | | | |
| | | Bi210 β- 5,0d | | | | | | | | |
| Pb206 stable | ←α | Pb210 138,4d | | | | | | | | |

| | | | | | | | | Th231 25,6h β- | →α | U235 7·10⁸a |
|---|---|---|---|---|---|---|---|---|---|---|
| URANIUM-235 | | | | | | | | | | |
| | | | | | | | | Ac227 22a β- | →α | Pa231 3,3·10⁴a |
| Pb211 36,1m β- | ←α | Po215 1,8ms | ←α | Rn219 3,9s | ←α | Ra223 11,4d | ←α | Th227 18,7d | | |
| Tl207 4,8m β- | ←α | Bi211 2,15m | | | | | | | | |
| | | Pb207 stable | | | | | | | | |

| | | | | | | | Ra228 5,7a β- | →α | Th232 1,4·10¹⁰a | | |
|---|---|---|---|---|---|---|---|---|---|---|---|
| THORIUM-232 | | | | | | | | | | | |
| | | | | | | | Ac228 6,13h β- | | | | |
| Pb212 10,6h β- | ←α | Po216 0,15s | ←α | Rn220 55,6s | ←α | Ra224 3,64d | ←α | Th228 1,9a | | | |
| Tl208 3,1m β- | ←α 36,2% | Bi212 60,6m β- 63,8% | | | | | | | | | |
| | | Pb208 stable | ←α | Po212 0,3μs | | | | | | | |

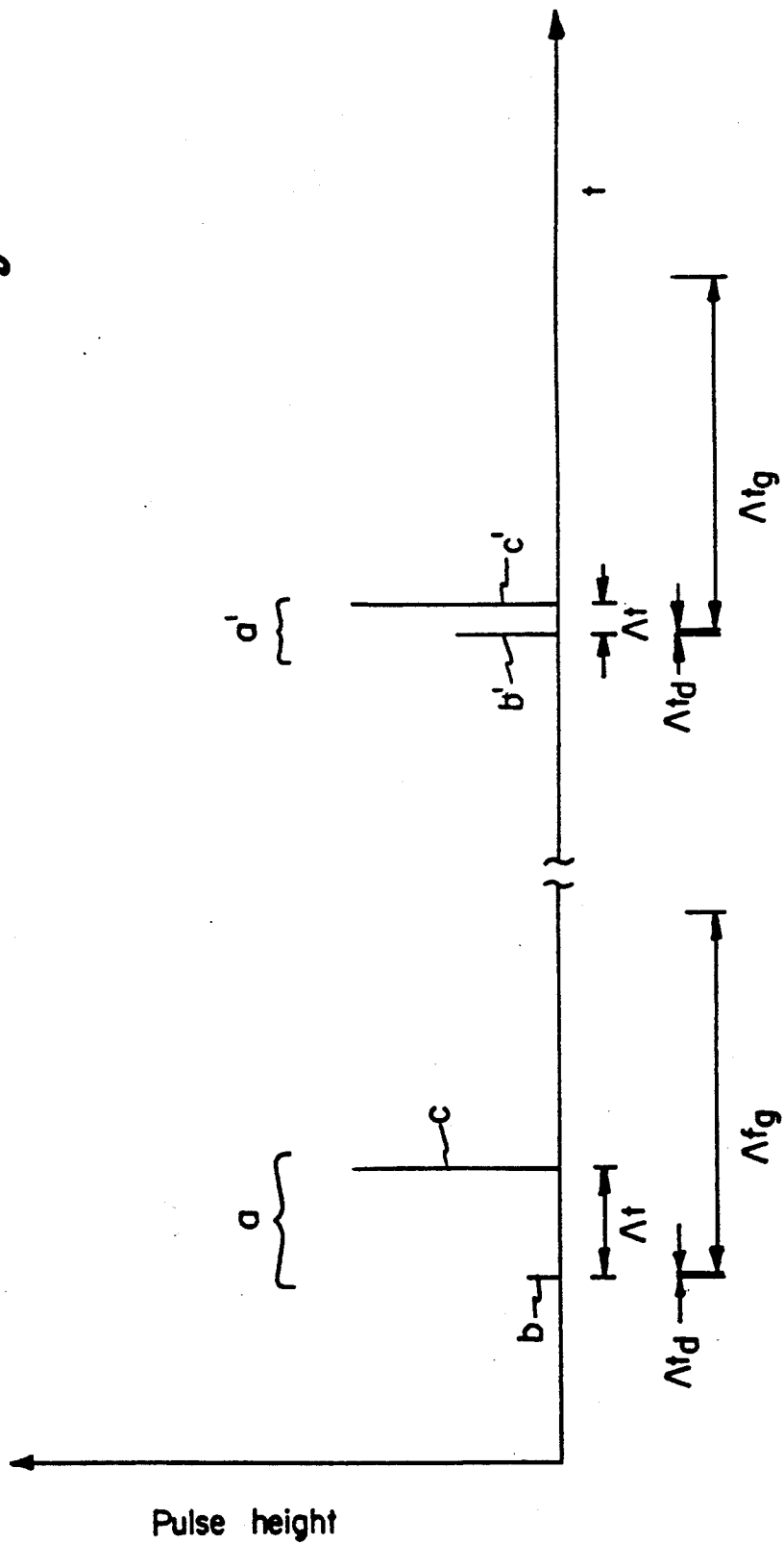

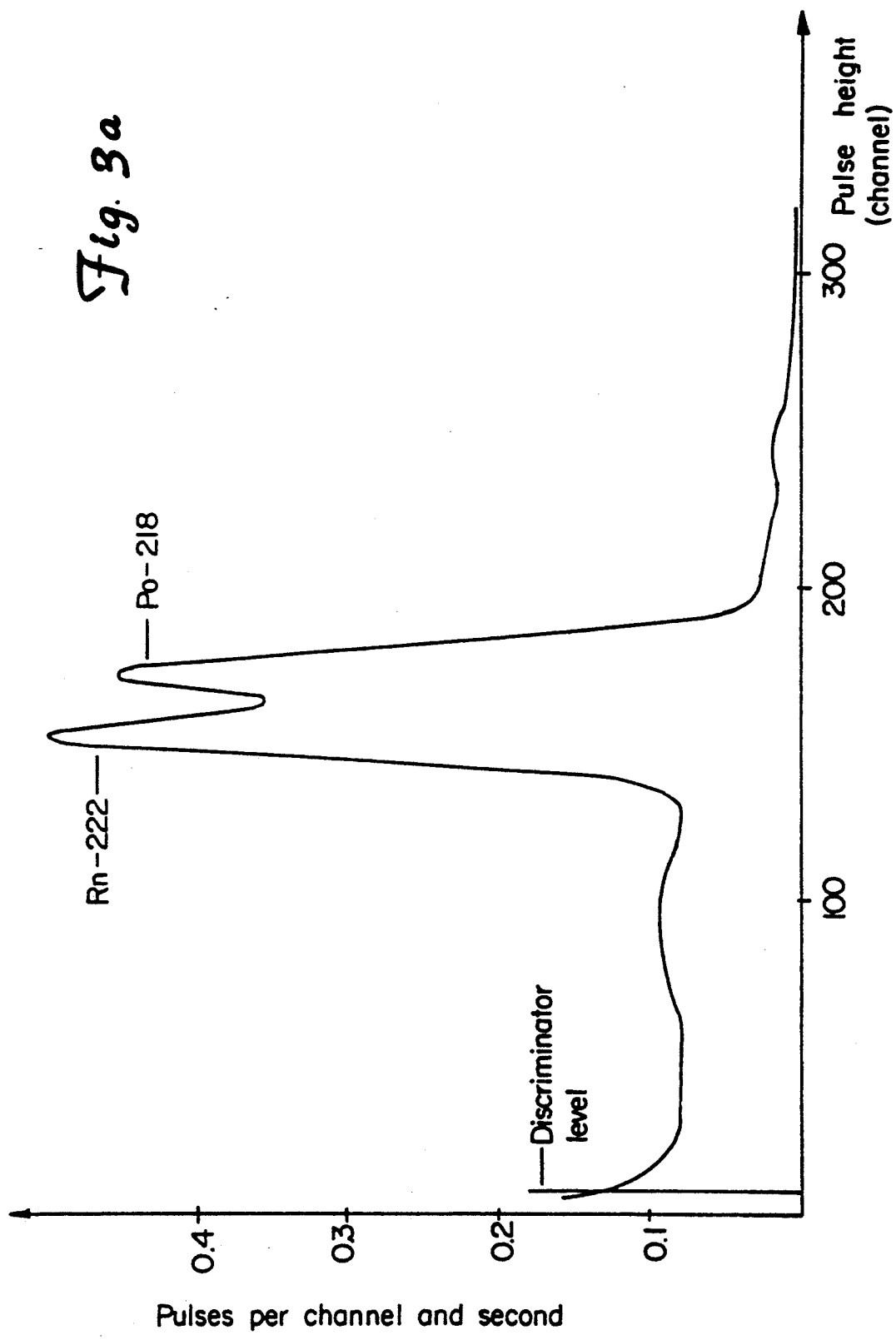

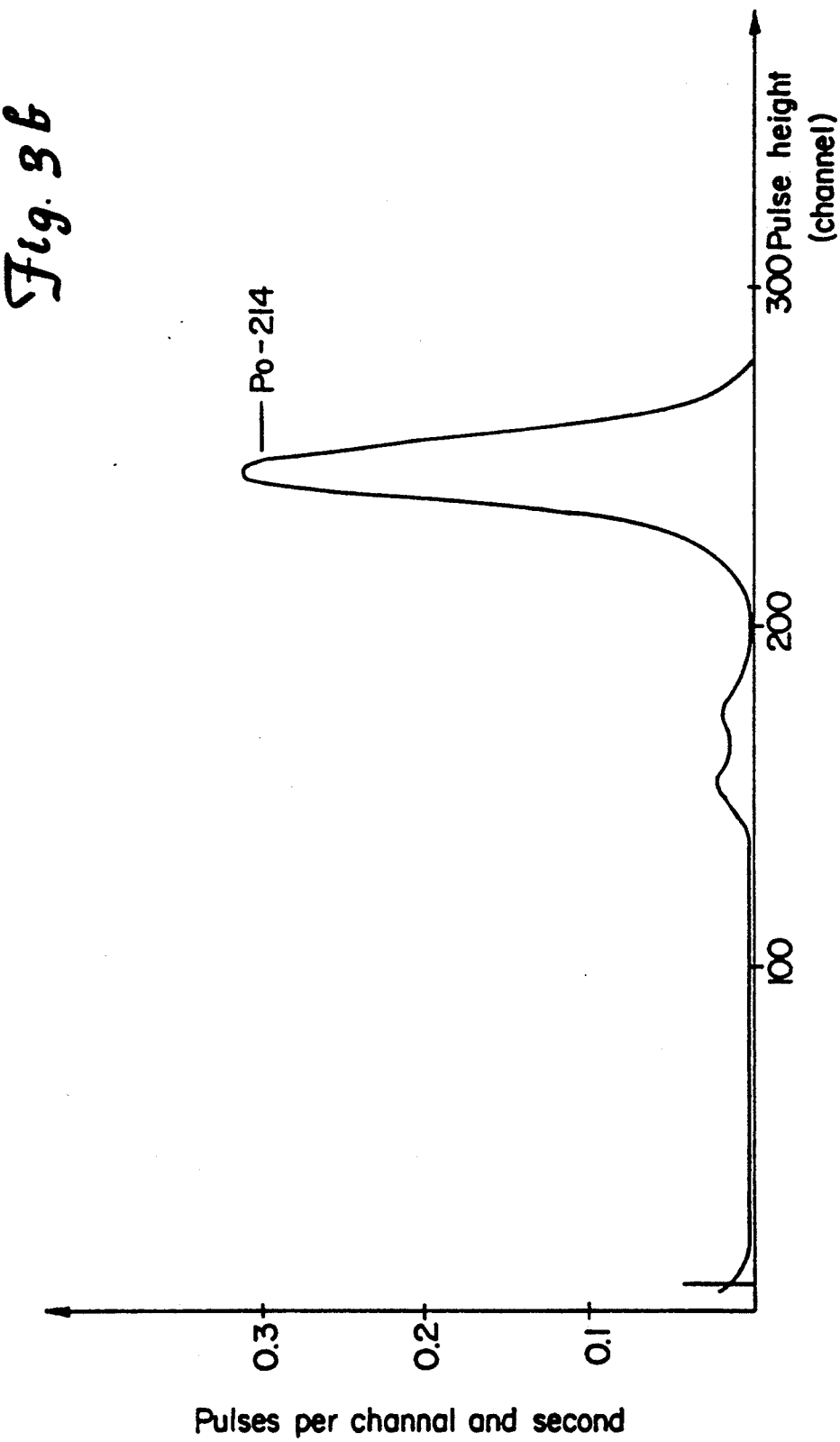

METHOD FOR LIQUID SCINTILLATION COUNTING OF RADIOACTIVE NUCLIDES

FIELD OF THE INVENTION

The present invention relates to a method for liquid scintillation counting of radioactive nuclides of the natural decay chains by the principle of delayed coincidence.

BACKGROUND OF THE INVENTION

As apparent from FIGS. 1a, 1b and 1c, a very short-lived member occurs in each of the three natural decay chains.

In the decay chain of U-238 (FIG. 1a) a product resulting from the decay of Rn-222 is the nuclide Bi-214 which, emitting $\beta$ radiation, decays into Po-214 which in turn decays with a half-life of 0.16 ms and emits $\alpha$ radiation.

In the decay chain of U-235 (FIG. 1b) the decay product of Ra-223 is the nuclide Rn-219 which, emitting $\alpha$ radiation, decays into Po-215 which in turn decays with a half-life of 1.8 ms and emits $\alpha$ radiation.

In the decay chain of Th-232 (FIG. 1c) a product resulting from the decay of Ra-224 is the nuclide Bi-212 which, emitting $\beta$ radiation, partly decays into Po-212 which in turn decays with a half-life of 0.3 $\mu$s and emits $\alpha$ radiation.

During some of the decays gamma radiation is additionally emitted.

Methods for counting nuclides of these decay chains by the principle of delayed coincidence employ the quick succession of decays of a mother nuclide Bi-214, Rn-219 or Bi-212 and its short-lived daughter nuclide Po-214, Po-215 or Po-212.

The successive decays cause pairs of quickly succeeding pulses to arise in the counting apparatus. The coincidence of these pulses within a brief time interval makes it possible to distinguish other pulses distributed statistically over the counting time provided their mean distance is substantially greater than the coincidence time interval. Such pulses are caused e.g. by other nuclides in the counting sample, by external gamma radiation or by cosmic radiation. The time difference between the pulses of a pair permits distinction from other coincidence events.

The probability of detecting a pair is proportional to the product of the probabilities of detection for the individual decay events. Detectors with high probabilities of detection are therefore preferable to those with low probabilities of detection. Liquid scintillators are particularly suitable since they have probabilities of detection of almost 100% for the $\alpha$ decays and high-energy $\beta$ decays taking place in them.

A method for liquid scintillation counting of nuclides of the natural decay chains by the principle of delayed coincidence is already known (G. Assaf and J. R. Gat, "Direct determination of short-lived radon daughter products on air filters by liquid scintillation counting using a delayed-coincidence technique," Nuclear Instruments and Methods 49 (1967), 29–37).

It is intended for counting decay products of Rn-222 in air. According to this literature, an air filter is immersed in a liquid scintillator cocktail after air has been drawn through the filter. The scintillations caused by the $\beta$ and $\alpha$ particles emitted during the decays of the collected atoms are converted into logical pulses by an assembly comprising a photomultiplier followed by a discriminator. Because the scintillator perfuses the air filter and surrounds it on all sides, almost a 4 ⊓ counting geometry is obtained for the emitted particles. Because the air filter becomes transparent in the scintillator, the light from flashes produced on the side of the filter facing away from the photomultiplier can also reach the photomultiplier.

The level of the discriminator is set as low as possible so that during $\beta$ decay of Bi-214, the mother nuclide of the short-lived member Po-214, the emitted electrons are detected down to an energy as low as possible. A first counter counts all logical pulses at the output of the discriminator.

To count the decays of the short-lived nuclide Po-214 by the principle of delayed coincidence, the logical pulses are processed at the output of the discriminator as follows, as is indicated particularly clearly by FIG. 2 of this literature. A unit called a "delay gate" in the cited paper produces a "gate open" pulse after each "random gate opening" discriminator pulse. This gate open pulse begins with a delay time delta $t_d$ (d=delay) after the discriminator pulse and has the length delta $t_g$ (g=gate). The term "random gate opening pulses" is used in this paper for all logical pulses at the output of the discriminator which do not occur themselves during a gate open interval. A coincidence unit, whose two inputs are connected with the outputs of the discriminator and the delay gate unit, creates at its output a logical pulse exactly when a pulse occurs at the output of the discriminator during a gate open pulse at the output of the delay gate unit. The pulses at the output of the coincidence unit are counted by a second counter.

According to this paper, the optimal length of the gate open interval is between five and ten times the half-life of Po-214 (0.8 ms or 1.6 ms). The delay time delta $t_d$ is selected as 2 $\mu$s, i.e. about 7 half-lives of Po-212 from the decay chain of Th-232. If a discriminator pulse comes from a decay of Bi-212, the mother of Po-212, the atom of the short-lived daughter nuclide Po-212 that was formed during this decay has most probably already decayed at the start of the gate open interval, i.e. the delay time prevents its decay from being falsely recorded as a Po-214 decay.

This paper points out that the described counting method with accordingly shorter time intervals delta $t_d$ and delta $t_g$ is also suitable for counting the decays of the nuclide pair Bi-212/Po-212 from the decay chain of Th-232.

The counting method described can be used for counting those samples consisting of a scintillator into which the nuclides to be counted have been introduced in a way other than via filters.

However, when high or very low activities are to be measured, or when the photon yield varies in the counting samples of a series, the method described in this paper has the following weaknesses:

(1) When samples are counted at a high count rate a large part of the total counting time is occupied by gate open intervals. This results in a nonnegligible probability that those discriminator pulses which do not come from a Po-214 decay will also occur during a gate open interval and be recorded in the second counter as decays of Po-214. The random delayed-coincidence events already necessitate elaborate numerical corrections at total count rates below 100 pulses per second.

(2) When the activity of the nuclides to be counted is small in a counting sample as compared to the background count rate U, the rate of random delayed-coincidence events is equal to $U^2 \cdot /\text{delta } t_g$. At a background count rate of e.g. 0.2 pulses/s and delta $t_g=1$ ms the resulting theoretical rate of random delayed-coincidence events is $4 \cdot /10^{-5}$ pulses/s. The true delayed-coincidence events caused by secondary radiation of single cosmic particles additionally appear in the second counter. This makes it difficult to count Ra-226 or Rn-222 activities in the range of a few $10^{-5}$ Bq.

(3) When the photon yield of two counting samples is different a different fraction of pulses which are produced by the $\beta$ decays of Bi-214 exceeds the discriminator level, i.e. the counting efficiency is different for the counting samples. The known counting method does not include any possibility of recognizing differences in the photon yield.

The weaknesses of the method according to Assaf and Gat are essentially due to the fact that no use is made of the energy information of the delayed-coincidence decay.

Further methods for liquid scintillation counting of nuclides of the natural decay chains which use only the time correlation of decay events and not the energy information of these decay events are described in the following literature:

P. Cross, G. W. McBeth and H. P. Primmington, "Rapid identification and radioassay of picocurie quantities of the alpha-emitting series," Nuclear Instruments and Methods 125 (1975), 425–427;

P. Cross and G. W. McBeth, "Absolute determination of trace quantities of the Ra-226 series by time interval analysis," Nuclear Instruments and Methods 137 (1976), 135–139.

Unlike these methods, the detectors used most frequently for counting nuclides of the natural decay chains, namely surface-barrier detectors, are specially designed for a high energy resolution during detection of $\alpha$ particles. The disadvantages of this type of detector are that:

(1) the maximum probabilities of detection attained are 50%, and (2) special methods must be used to produce extremely thin counting samples that permit a largely undisturbed emission of $\alpha$ particles.

It is particularly difficult to process radium quantitatively into a thin counting sample, one of the essential applications of the invention being to count radium.

A compromise is liquid scintillation $\alpha$ spectroscopy. It combines a probability of detection of 100% for the $\alpha$ decays in the scintillator with a moderate energy resolution. It has gained importance since it has become possible to distinguish by pulse-shape analysis between $\alpha$ decays, on the one hand, and $\beta$ decays and background events, on the other (W. J. McDowell, "Alpha liquid scintillation counting: past, present and future" in "Liquid scintillation counting, recent applications and development", Vol. I, Physical aspects, Academic Press, New York 1980; T. Oikari, H. Kojola, J. Nurmi and L. Kaihola, "Simultaneous counting of low alpha and beta particle activities with liquid scintillation spectrometry and pulse-shape analysis," Appl. Radiat. Isot. 38 (1987), 875–878). A precondition for successful pulse-shape analysis is the absence of certain quenching pollutants in the scintillator and thus special care during preparation of the samples.

Information on both, the energy and the time correlation of detector events, is provided by so-called "time-of-event" counting methods. In these methods the time an event occurs together with the energy information and any additional information is stored successively event by event. Such methods have been applied up to now for counting with low-level gas counters and are described e.g. in the following literature:

L. A. Currie, R. W. Gerlach, G. A. Klouda, F. C. Ruegg and G. B. Tompkins, "Miniature signals and miniature counters: accuracy assurance via microprocessors and multiparameter control techniques, "Radiocarbon 25 (1983), 553–564;

L. Kaihola, H. Polach and H. Kojola, "Time series analysis of low level gas counting data," Radiocarbon 26 (1984), 159–165;

L. Kaihola, H. Kojola, H. Polach, P. Mäntynen, J. Tervahauta and E. Soini, "Low level gas multicounter for C-14 dating of small samples: electronic, numerical and shielding optimization," Third Nordic Conference on the application of scientific methods in archaeology, Mariehamm, Aland, Finland, The methods described by Kaihola et al. work with a time resolution of 10 or more ms, i.e. they are not designed for detecting Rn-222 contaminations in the counting gas, for which Assaf and Gat consider a time resolution in the range of 1 ms to be expedient. Instead, Kaihola, Polach and Kojola expressly point out that they used time series analysis only to detect periodic effects.

However, time-of-event counting methods are basically also very well-suited for liquid scintillation counting of the nuclides stated in the invention. A disadvantage of these methods is the high electronic elaborateness which is necessary in particular if the information should already be presented clearly to the experimenter during a measurement. Also, such methods can be installed only with great effort in the customary liquid scintillation spectrometers which are equipped with multichannel analyzers.

SUMMARY OF THE INVENTION

The invention provides a method for liquid scintillation counting of radioactive nuclides of the natural decay chains of Th-232, U-238 and U-235 by detecting decay events of the short-lived members Po-212, Po-214 and Po-215 of these decay chains by the principle of delayed coincidence. The invention is characterized in that a separate pulse height spectrum is recorded for those pulses detected by the counting device which occur within a fixed short time interval after a preceding pulse.

BRIEF DESCRIPTION OF THE DRAWINGS

FIGS. 1a, 1b and 1c show the natural decay chains, respectively, for Uranium-238, Uranium-235, and Thorium-232;

FIG. 2 illustrates the sequence of pulses from delayed coincident pulse pairs in a scintillator detecting decay events of members of a decay chain;

FIGS. 3a and 3b, respectively, show the "spectrum of other pulses," and the "spectrum of delayed-coincidence pulses," each as recorded during the counting of a Rn-222 sample in accordance with the invention.

DESCRIPTION OF THE PREFERRED EMBODIMENT

Figure 4:
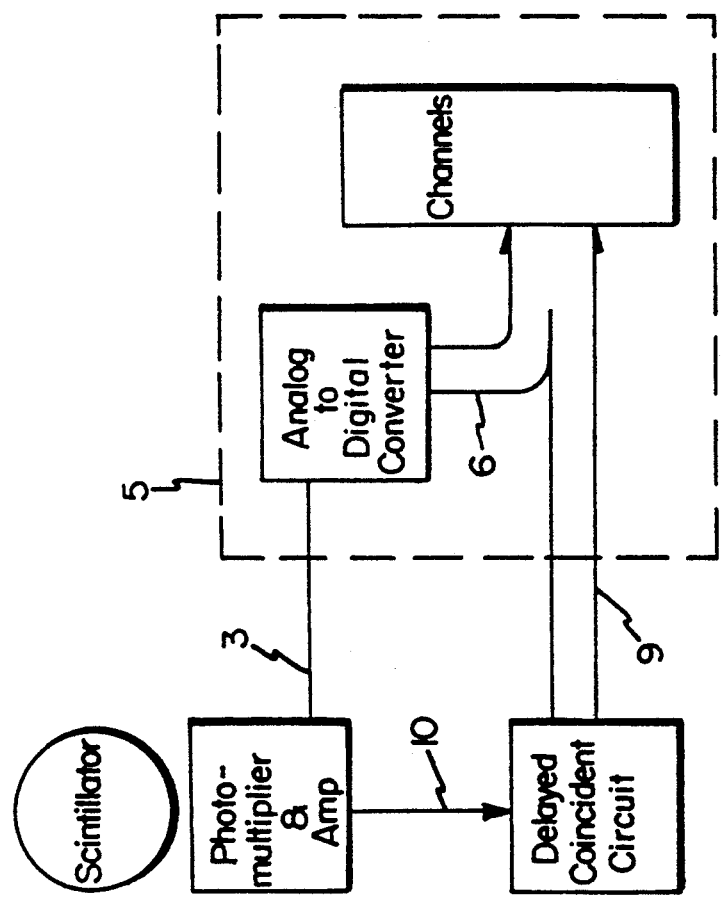
FIG. 4 is a block diagram illustrating an embodiment of an apparatus for performing the invention.

The invention is based on the problem of increasing in a simple way the sensitivity and accuracy of delayed coincidence liquid scintillation counting for some nuclides of the natural decay chains.

This is achieved by detecting decay events of the short-lived members Po-212, Po-214 and Po-215 of these decay chains by the principle of delayed coincidence, characterized in that a separate pulse height spectrum is recorded from those pulses of the counting device which occur within a fixed short time interval after a preceding pulse. The inventive method can be used in particular for counting extremely low activities of Rn-222 and Ra-226 and of Pb-212, Rn-220, Ra-224, Th-228 and Ra-228 and for correcting the quenching in liquid scintillation counting.

"FIG. 4 is a simplified block diagram representing one possible embodiment of an apparatus for performing the claimed method. In FIG. 4, scintillations produced by the emitted particles in scintillator 1 are converted in unit 2, which comprises photomultipliers and a subsequent amplifier, into voltage pulses 3 whose amplitude is a measure of the intensity of the scintillations. Pulses 3 are converted by an analog-to-digital converter (ADC) 4 of a multichannel analyzer 5 to a n bit output 6. Unit 7 represents the channels of analyzer 5. When between delta $t_d$ and delta $t_d$+delta $t_g$ after a preceding pulse, an input pulse 10 is transmitted from unit 2 to electronic circuit 8 then electronic circuit 8 sets an output bit 9 from the normal state "low" (=0) to "high" (=1). Normally the incoming pulse 6 would be assigned by the ADC 4 to a certain channel of unit 7 in accordance with its pulse height, and the pulse would be stored in this channel, i.e. the content of this channel would be increased by 1. According to the invention, however, when the output bit 9 of circuit 8 is set "high", pulse 6 is stored in a channel of unit 7 whose number is $2^2$ higher than that number determined by the ADC 4 from the pulse height."

For example, the counting of Rn-222 from the decay chain of U-238 is performed according to the invention as follows. The Rn-222 is mixed with a liquid scintillator. After a few hours the decay products of Rn-222 up to Po-214 are virtually in radioactive equilibrium, i.e. an equal number of nuclei of each of the decay products decays per time interval as of Rn-222.

The scintillations produced by the emitted particles in the scintillator are converted by photomultipliers and a subsequent amplification unit into voltage pulses whose amplitude is a measure of the intensity of the scintillations. It is unimportant whether one or more photomultipliers are used and whether the relation between the intensity of a scintillation and the pulse height is linear or logarithmic, as in some commercially available liquid scintillation spectrometers.

FIG. 2 shows a diagram illustrating the succession of light pulses in the scintillator, or the corresponding voltage pulses at the output of the amplification unit. Along with the pulses coming from the decays of Rn-222, Po-218, Pb-214 and the counting background, pairs of quickly succeeding pulses occur which come from the decays of Bi-214 and its daughter Po-214. Po-214 has a very short half-life of about $1.6 \cdot 10^{-4}$ s. Within this time, therefore, half of all Po-214 nuclei decay which were just formed before by a $\beta$ decay of Bi-214. For example, after 5 half-lives (about $8 \cdot 10^{-4}$ s) a newly formed Po-214 nucleus has decayed with a probability of 97%.

With the pulse pairs a and a' which arise through the $\beta$ decay b, b' of the mother nuclide Bi-214 and the $\alpha$ decay c, c' of the daughter nuclide Po-214, the pulse of the daughter nuclide is shifted in time by delta $t = 3 \cdot 10^{-4}$ s and delta $t' = 0.8 \cdot 10^{-4}$ s.

Because delta t and delta t' are greater than the selected delay time interval delta $t_d$ (e.g. $3 \cdot 10^{-6}$ s) and smaller than the sum of delta $t_d$ and the gate open interval delta $t_g$ (e.g. $1 \cdot 10^{-3}$ s), the pulse pairs a and a' are regarded as results of decays of the nuclide pair Bi-214/Po-214. Delta $t_d$ and delta $t_g$ in FIG. 2 have the above-mentioned meaning.

The electrons emitted during the $\beta$ decay of Bi-214 have a wide energy distribution (see e.g. b and b' in FIG. 2). However, the $\alpha$ particles of Po-214 have a sharp energy value of 7.69 MeV (see e.g. c and c' in FIG. 2) and provide in a pulse height or energy spectrum a relatively sharp peak whose width depends solely on properties of the counting assembly.

Instead of only counting the pairs of decays of the mother nuclide and short-lived daughter nuclide, as in the method described by Assaf and Gat, the inventive method thus involves recording the pulse height spectrum of the short-lived daughter nuclide, i.e. the spectrum of Po-214 in the above-mentioned example in which Rn-222 is counted. This can be done in two ways. One either stores only those pulses in a spectrum which are delayed by at least delta $t_d$ and at most delta $t_d$+delta $t_g$ after a preceding pulse higher than an adjusted discriminator level, in which case only one spectrum is obtained. Or one stores these pulses in a separate spectrum apart from all other pulses, in which case two spectra are recorded: the "spectrum of delayed-coincidence pulses" and the "spectrum of the other pulses."

A particularly simple modification for this purpose of the multichannel analyzers normally used in nuclear radiation spectroscopy is as follows. In a multichannel analyzer an incoming pulse is normally assigned by the analog-to-digital converter (ADC) to a certain channel of the pulse height spectrum in accordance with its height. The pulse is stored in this channel, i.e. the content of this channel is increased by 1. The channel numbers of a spectrum with $2^n$ channels (no. 0 to no. $2^n - 1$) are represented in the device binarily by n bits.

In the modification as it can be used for with detecting decay events of the short-lived members Po-212, Po-214 and Po-215 of those decay chains by the principle of delayed coincidence, outlined above the channel numbers are represented not by n, but by n+1 bits. The preceding bit no. n+1 is set by an additional electronic circuit (whose design is unimportant) from the normal state "low" (=0) to "high" (=1) only for a pulse occurring at least delta $t_d$ and at most delta $t_d$+delta $t_g$ after a preceding pulse.

Such a delayed-coincidence pulse is thus stored in a channel whose number is $2^n$ higher than that number determined by the ADC from the pulse height. For example, a delayed-coincidence pulse which would be stored in terms of its height in channel 131 of a 512 channel spectrum (n=9) (binary representation of channel number 131=0 1 0 0 0 0 0 1 1) is stored in channel 131+512 of the multichannel system (binary representation of channel number 131+512=1 0 1 0 0 0 0 0 1 1).

FIGS. 3a and 3b show the "spectrum of the other pulses" and the "spectrum of delayed-coincidence pulses" as they were recorded during the counting of a Rn-222 sample with a liquid scintillation spectrometer modified accordingly for the inventive method. The "spectrum of delayed-coincidence pulses" shows the peak of the 7.69 MeV $\alpha$ particles of Po-214.

An advantage of the inventive method compared to those described by Assaf and Gat and by Cross et al. is that the rate of those delayed-coincidence pulses whose heights lie within a certain pulse height interval can be used selectively for evaluation. Restriction to a certain pulse height interval substantially reduces the spurious influence of delayed-coincidence pulses not coming from decays of the short-lived daughter nuclide. Such delayed-coincidence pulses are caused, firstly, by so-called "random delayed coincidence" whereby the delayed-coincidence pulse has no causal relation with the gate opening pulse and, secondly, by true delayed-coincidence events due to secondary radiation of single cosmic particles.

In the stated example in which Rn-222 is counted with a liquid scintillation spectrometer by the inventive method, the effect of random delayed coincidence is such that a pulse not coming from a Po-214 decay is stored in the spectrum of delayed-coincidence pulses if it occurs randomly during a gate open interval. The probability of occurrence during a gate open interval is given by the proportion of the sun of gate open intervals to the total counting time. As a first approximation this proportion is equal to the product of the length of the gate open interval and the total pulse rate R above the discriminator level, i.e. delta $t_g \cdot R$. The effect of random delayed coincidence thus causes, in a first approximation, an image of the spectrum of the other pulses multiplied by a factor of delta $t_g \cdot R$ to be transferred into the spectrum of delayed-coincidence pulses.

For example, in the counting whose spectra are shown in FIGS. 3a and 3b, delta $t_g = 1$ ms and $R = 40$ pulses/s. The spectrum of delayed-coincidence pulses (FIG. 3b) accordingly shows in addition to the Po-214 peak an image of the spectrum of the other pulses (FIG. 3a) multiplied by a factor of 0.04 (=1 ms $\cdot 40$ s$^{-1}$), whereby FIG. 3a clearly indicates the Rn-222 and Po-218 peaks. It is apparent that only a small number of pulses in the transferred spectrum lie in the channel interval of the Po-214 peak, and that the pulse rate in the channel interval of this peak is therefore much less falsified than the rate of all delayed-coincidence pulses, which is employed for evaluation in methods that make no use of the energy information.

In the stated example in which Rn-222 is counted with a liquid scintillation spectrometer by the inventive method, the true delayed-coincidence events caused by cosmic radiation are more important than the random delayed-coincidence events in the spectrum of delayed-coincidence pulses when extremely weak samples are counted. The following table presents the results of counting a blank for one week. The blank consists of 3 ml INSTA-GEL ® brand solution in a quartz vessel. Delta $t_g$ is 1.0 ms. The table contains the pulse rates in the total spectrum and in the spectrum of delayed-coincidence pulses of the blank. For comparison the calculated rates of the random delayed-coincidence events are additionally stated. The pulse rates of the blank are summed up in the table once through all channels above the discriminator level and once through the channels (two half-maximum widths) of the channel interval in which the Po-214 peak is expected.

TABLE

| | Pulse rate (s$^{-1}$) of the blank | | |
|---|---|---|---|
| | | Spectrum of delayed-coincidence pulses | |
| | Total Spectrum[1] | Counted | Calculated random delayed coincidence events |
| Above discriminator level | 0.21[2] | $2 \cdot 10^{-4}$ | $4 \cdot 10^{-5[3]}$ |
| And in channel interval of Po-214 peak | $4.5 \cdot 10^{-3}$ | $7 \cdot 10^{-6}$ (4 pulses in 1 week) | $9 \cdot 10^{-7[4]}$ |

[1]Pulses of the spectrum of delayed-coincidence pulses plus the pulses of the spectrum of the other pulses.
[2]Total pulse rate R
[3]Calculated according to the formula $R^2 \cdot$ delta $t_g$ where delta $t_g = 10^{-3}$ s
[4]Calculated accoridng to the formula R $\cdot$ delta $t_g$ times the value in the column entitled "Total Spectrum" and in the row entitled "And in channel interval of Po-214 peak", where delta $t_g = 10^{-3}$ s.

It is apparent from the table that the pulse rate of $7 \cdot 10^{-6}$ s$^{-1}$ "counted" in the channel interval of the Po-214 peak in the spectrum of delayed-coincidence pulses is much lower than the pulse rate of $2 \cdot 10^{-4}$ s$^{-1}$ in the whole spectrum above the discriminator level, and that the inventive method thus has an extremely low detection limit. That is, in comparison with the method described in Nuclear Instruments and Methods 49 (1967), 29–37, the background count rate is about thirty times lower, as this example illustrates.

As reported by Oikari et al., pulse-shape analysis can yield a background count rate in the Po-214 energy window that is approximately as low as in the inventive method. However, the inventive method makes lower demands on the sample composition and is therefore more robust. One can readily combine the two methods to reduce the detection limit even further.

The inventive method can be extended in such a way that a delayed-coincidence pulse is stored in one of a whole family of spectra. This can be performed electronically by using not only bit no. n+1, but the bits n+1, n+2, n+3, etc., for assigning a pulse to a certain spectrum of the family. One of these bits or a combination of several of these bits is thus set from 0 to 1. This makes it possible to store in separate spectra the pulses of the decay events of certain nuclides of a nuclide mixture.

For example, a delayed-coincidence pulse can be assigned to a certain spectrum of a family of spectra in accordance with the time interval after the preceding pulse. This permits simultaneous counting of the three radium isotopes Ra-224, Ra-226 and Ra-223. The decay events of these three radium isotopes lead, partly through intermediate products, to the nuclides Bi-212, Bi-214 and Rn-219, whose daughter nuclides Po-212, Po-214 and Po-215 decay with the short half-lives of $3 \cdot 10^{-7}$ s, $1.6 \cdot 10^{-4}$ s and $1.8 \cdot 10^{-3}$ s while emitting $\alpha$ particles. If all pulses are stored e.g. in four different spectra, the pulses being delayed after a preceding pulse by more than $1 \cdot 10^{-2}$ s in spectrum 1,
less than $3 \cdot 10^{-6}$ s in spectrum 2,
between $3 \cdot 10^{-6}$ s and $1 \cdot 10^{-3}$ s in spectrum 3, and
between $1 \cdot 10^{-3}$ s and $1 \cdot 10^{-2}$ s in spectrum 4,
then
the Po-212 decay events appear in spectrum 2,
the Po-214 decay events appear in spectrum 3,
the Po-215 decay events appear in spectrum 4, and
all other pulses appear in spectrum 1.

In evaluating such a measurement, however, one must note that overlapping occurs when the decay events are assigned to the spectra. For example, 1.3% of the Po-214 nuclei decay in less than $3 \cdot 10^{-6}$ s and are stored in the spectrum of Po-212 decay events; another 1.4% of the Po-214 nuclei decay later than after $1 \cdot 10^{-3}$ s and are stored in the spectrum of Po-215 decay events.

Also, a small number of decay events of the relatively short-lived Po-216 from the Th-232 decay chain are stored in particular in the spectrum of Po-215 decay events, the spectrum with the longest assigned coincidence time interval. This can considerably disturb the counting of nuclides from the U-235 decay chain because the natural activity of these nuclides is more than one order of magnitude smaller than the activity of the nuclides from the Th-232 decay chain.

To control the storage of a delayed-coincidence pulse in a certain spectrum of a family of separate spectra, one can use other criteria in addition to the time interval after the preceding pulse, for example:

the type of decay causing the gate opening pulse and/or the delayed-coincidence pulse, which can be ascertained e.g. by pulse-shape analysis, the pulse height of the gate opening pulse, and the occurrence of gamma radiation coincident with the gate opening pulse or with the delayed-coincidence pulse in a further detector of the counting assembly.

It is apparent that the inventive method involves a simple way of counting extremely low activities of nuclides from the three natural decay chains, particularly from the U-238 and Th-232 decay chains. Such nuclides are all those precursors of the short-lived polonium isotopes from which a sufficiently high activity of the short-lived polonium isotopes can grow within a reasonable waiting period. The decay chain up to the Po isotope must therefore not be blocked by an intermediate member that is too long-lived. The most important of these nuclides are Rn-222, Ra-226, Rn-220, Ra-224, Th-228 and Ra-228.

The nuclides to be counted can be introduced into a liquid scintillator in many different ways.

To count the Rn-222 content of water one can, for example, mix some ml of water directly with a scintillator, or extract the radon from the water into a scintillator which cannot be mixed with water.

A method of introducing radon from air into a liquid scintillator is described e.g. in "Protocol for using Packard PICO-RAD charcoal LCS detectors to measure radon concentrations in air," CANBERRA Co. (1987/88).

Nongaseous substances can be mixed in the form of an aqueous solution with a suitable liquid scintillator. For example, the applicant has, for about five years, routinely separated the radium isotopes from ground water samples using about 100 mg $BaCl_2 \cdot 2H_2O$ as a carrier and Ba-133 as the yield tracer, and united them into a counting sample as 1 ml aqueous barium chloride solution with 2 ml INSTA-GEL ® brand solution from the Packard Co. This one counting sample has been used to determine the contents of Ra-226, Ra-224 and Ra-223 by one or more measurements a few days after preparation. Three or more months after preparation, when the long-lived Th-228 has grown sufficiently from the Ra-228 in the counting sample, a further measurement yields the Ra-228 content and additionally the Ra-226 content again.

In this said further measurement the decay products of Ra-226 up to Po-214 are in Radioactive equilibrium, i.e. an equal number of nuclei of the decay products decays per time interval as of Ra-226.

The contents of the stated nuclides are of interest e.g. in ground water, materials and works of art, where they can be used to estimate age, in detector and building materials for radiation meters, in food and in high-purity silicon for computer chips, because $\alpha$ decay in the chips may cause calculating errors, so-called "soft errors."

The inventive method can also be used to determine spurious traces of the stated nuclides in samples which are to be tested for the content of other nuclides, so that the counting results can be accordingly corrected. The liquid scintillator cocktails used are presumably often contaminated with radon due to the solubility of radon in organic liquids, the high concentration of radon in room air and the production of radon in vessel materials.

Another essential application of the inventive method is, to correct the quenching in the liquid scintillation counting of other nuclides.

Liquid scintillation counters are usually used for counting $\beta$ emitters. The electrons emitted during the $\beta$ decay of a nuclide have a wide energy distribution. In the range of low energy values the pulses of these electrons are masked by the noise of the counting device, so that only the part of the $\beta$ spectrum above a certain level is available for determining the activity. The proportion of this part to the whole $\beta$ spectrum changes when the photon yield in the scintillator is reduced. This "quenching" may be caused by a great number of chemical impurities particularly in medical and biological applications, so that the correction of quenching is a substantial component of liquid scintillation counting.

The application of the inventive method consists in counting a sample, adding Rn-222 to it and counting it a second time. The Rn-222 gas is expediently taken, e.g. with a syringe, from a vessel containing Ra-226. Using calibration curves one can then determine the value of the necessary quench correction from the channel position of the $\alpha$ peak of Po-214 in the spectrum of delayed-coincidence pulses (see FIG. 3b).

For example, if one wants to count the tritium content of a sample one first, with a predetermined amount of tritium and different concentrations of the quenching compound, records the tritium counting efficiency in accordance with the channel position of the peak of Po-214 in the form of a calibration curve. One then records the count rate of the tritium sample to be counted. Rn-222 is then added to the sample and, after a time span of half an hour or more, i.e. when the daughter nuclides Pb-214 and Bi-214 have been sufficiently reproduced, the sample is counted again and the channel position of the Po-214 peak determined. The channel position can then be used to read the tritium counting efficiency from the calibration curve, and thus determine the decay rate of the tritium, i.e. the tritium content, from the count rate.

The advantages of this method over other quench correction methods using a so-called "internal standard" are that the position of the $\alpha$ peak can be precisely determined, the quenching of the sample is not changed by the addition of Rn-222, i.e. a gaseous internal standard, the Rn-222 together with its daughter nuclides has decayed after a good month except for some low activity of Pb-210 and its decay products so that the sample virtually exists again in its original state, and the Rn-222 can easily be "milked" out of a virtually inexhaustible Ra-226 source.

If one dispenses with the delayed-coincidence method when using Rn-222 as an internal standard for quench correction, i.e. records only the total spectrum, one cannot determine the middle of the Po-214 peak as simply and precisely as using the inventive method, particularly with highly quenched samples.

Because the gate opening pulses for the short-lived nuclides Po-212 and Po-214 are produced by the $\beta$ decay of the mother nuclides, quenching must also be considered when counting nuclides from the corresponding decay chains by the principle of delayed coincidence. The inventive method allows for determination of the extent of necessary quench correction.

I claim:

1. A method for liquid scintillation counting of radioactive nuclides of the natural decay chains of Th-232, U-238 and U-235 by detecting decay events of the short-lived members Po-212, Po-214 and Po-215 of these decay chains by the principle of delayed coincidence, characterized in that a plurality of pulse height spectra are recorded from the delayed coincidence pulses which occur within a plurality of successive fixed time intervals after a gate-opening pulse, and in that each said delayed coincidence pulse counted is assigned to a corresponding one of said plurality of pulse height spectra based on the time interval in which the delayed coincidence pulse occurred.

2. The method of claim 1, wherein the length of said fixed time interval is one to ten times the half-life of the short-lived member to be counted.

3. The method of claim 1 for counting Rn-222 or Ra-226, whereby the activity of the Rn-222 or Ra-226 is calculated from the content of an alpha peak of Po-214 in the corresponding spectrum of the delayed coincidence pulses.

4. The method of claim 1 for counting Ra-224 or Ra-228, whereby the activity of the nuclide to be counted is calculated from the content of an alpha peak of Po-212 in the corresponding spectrum of the delayed coincidence pulses.

5. The method of claim 1 wherein the quenching in the liquid scintillation counting system is determined by adding Rn-222 to a sample, obtaining the position of the alpha peak of Po-214 in the corresponding spectrum of the delayed coincidence pulses, and comparing said position to a separately recorded calibration curve to determine said quenching.

6. A method for liquid scintillation counting of radioactive nuclides of the natural decay chain of U-238 by detecting decay events of the short-lived member Po-214 of this decay chain by the principle of delayed coincidence, characterized in that a separate pulse height spectrum is recorded from the delayed coincidence pulses which occur within a fixed time interval after a gate-opening pulse, whereby the activity of Rn-222 or Ra-226 is calculated from the content of an alpha peak of Po-214 in the separate pulse height spectrum.

7. The method of claim 6 wherein the length of said fixed time interval is one to ten times the half-life of the short-lived member to be counted.

8. A method for liquid scintillation counting of radioactive nuclides of the natural decay chain of Th-232 by detecting decay events of the short-lived member Po-212 of this decay chain by the principle of delayed coincidence, characterized in that a separate pulse height spectrum is recorded from the delayed coincidence pulses which occur within a fixed time interval after a gate-opening pulse, whereby the activity of Ra-224 or Ra-228 is calculated from the content of an alpha peak of Po-212 in the separate pulse height spectrum.

9. The method of claim 8 wherein the length of said fixed time interval is one to ten times the half-life of the short-lived member to be counted.

* * * * *